United States Patent [19]
Dangelo

[11] Patent Number: 5,946,487
[45] Date of Patent: Aug. 31, 1999

[54] OBJECT-ORIENTED MULTI-MEDIA ARCHITECTURE

[75] Inventor: Carlos Dangelo, Los Gatos, Calif.

[73] Assignee: LSI Logic Corporation, Milpitas, Calif.

[21] Appl. No.: 08/661,183

[22] Filed: Jun. 10, 1996

[51] Int. Cl.$^6$ ..................................................... G06F 9/45
[52] U.S. Cl. .......................... 395/705; 395/702; 395/706; 395/707; 395/710; 395/406; 395/672; 395/675; 395/800.28; 345/502; 345/505
[58] Field of Search ............................ 395/702, 705–707, 395/710, 406, 672–677, 527, 500, 800.32, 800.41, 200.31, 200.68, 200.5, 200.56, 800.28; 345/502, 505, 501; 711/6

[56] References Cited

U.S. PATENT DOCUMENTS

| 5,088,036 | 2/1992 | Ellis et al. | 707/206 |
| 5,457,780 | 10/1995 | Shaw et al. | 345/502 |
| 5,692,193 | 11/1997 | Jagannathan et al. | 395/676 |
| 5,706,515 | 1/1998 | Connelly et al. | 395/676 |
| 5,724,590 | 3/1998 | Goettelmann et al. | 395/707 |
| 5,745,757 | 4/1998 | Lecoutier | 395/672 |

OTHER PUBLICATIONS

"Java's Virtual World: Java Components Include High–Level Language and Virtual Machine," by Mark Lentczner, Microprocessor Report, Mar. 26, 1996, p. 8.

"Implementing the Java Virtual Machine—Java's Complex Instruction Set Can Be Built in Software or Hardware," by Brian Case, Microprocessor Report, Mar. 25, 1996, p. 12.

ARM7500 Data Sheet, Advanced RISC Machines Ltd. of Cambridge, England, 1995.

"The Next 10,000$_2$ Years: Part 1", by Ted Lewis, IEEE Computer, Apr. 1996, p. 64.

Wind River Systems, *VxWorks* 5.2, Jul. 1, 1998, pp. 1–8.

Microwave Systems Corporation, *Microwave OS–9: The Framework for Your Product*, Jul. 1, 1998, pp. 1–11.

ISI Embedded Solutions, *pSOS+and pSOS+m™Kernels*, Sep. 29, 1998, pp. 1–2.

*Primary Examiner*—Tariq R. Hafiz
*Assistant Examiner*—Tuan Q. Dam

[57] ABSTRACT

An object-oriented, multi-media architecture provides for real-time processing of an incoming stream of pseudo-language byte codes compiled from an object-oriented source program. The architecture includes a plurality of processors arranged for parallel processing. At least some of the processors are especially adapted or optimized for execution of multi-media methods such as video decompression, inverse discrete cosine transformation, motion estimation and the like. The architecture further includes a virtual machine computer program that reconstructs objects and threads from the byte code stream, and routes each of them to the appropriate hardware resource for parallel processing. This architecture extends the object-oriented paradigm through the operating system and execution hardware of a client machine to provide the advantages of dedicated/parallel processors while preserving portability of the pseudo-language environment.

20 Claims, 5 Drawing Sheets

OBJECT-ORIENTED MULTI-MEDIA ARCHITECTURE

FIELD OF THE INVENTION

The present invention pertains to the field of digital computer hardware and software architectures and, more specifically, relates to an object-oriented, multi-media architecture for processing multi-media data in real time.

BACKGROUND OF THE INVENTION

Multi-media systems combine a variety of information sources such as voice, graphics, animation, images, audio and full-motion video into a wide range of applications. In general, multi-media represents a new combination of three historically distinct industries: computing, communication and broadcasting. The defining characteristic of multimedia systems is the incorporation of continuous media such as voice, video and animation. Distributed multi-media systems require continuous data transfer over relatively long periods of time, for example play-out of a video stream from a remote camera, media synchronization, very large storage and other technical challenges.

New and improved uses of multimedia systems find a wide variety of applications. Examples include set-top boxes and interactive television, multi-media libraries (databases), portable computers, game machines, advanced portable digital instruments, mobile terminals, and world wide web pages. The large amounts of data involved in multi-media applications, and the need for real-time or near real-time processing presents challenges to both hardware and software system designers. These challenges are being addressed on a number of different fronts, such as improvements in compression algorithms and special purpose hardware processors. The complexity of multi-media applications stresses all the components of a computer system. Multi-media data requires very substantial processing power for implementing graphics, transformations, data decompression, etc. The architecture obviously must provide very high bus bandwidth and efficient input/output ("I/O"). A multi-media operating system should support new data types, real-time scheduling, and fast interrupt processing.

Historically, data processing has evolved from an environment that incorporated solely character data. Computer graphics and other multi-media components are relatively new arrivals on the scene. Conventional computer systems also are characterized by linear or "flat" processing. Computers sequentially executed a predetermined series of instructions that operated on collections of characters. In most cases, batch processing was employed. It is also significant to note, by way of background, that computer processors historically were general purpose processors. That is, computers were designed to carry out whatever particular function might be implemented by the application program. Only in relatively unusual situations were "dedicated processors" developed to meet special needs. Accordingly, prior art computer architectures were designed to execute whatever series of instructions was presented by the programmer. The specific application was unknown to the system architect a priori and, accordingly, the architecture could not be optimized for any particular application. Thus, while general purpose computers are flexible in application, performance is limited.

The advent of multi-media applications has motivated development in several different hardware and software areas. For example, the large amounts of data required for multi-media applications has driven advances in compression/decompression technologies. We have seen development of JPEG standards for audio compression and MPEG standards for video data compression. MPEG2 is the standard currently implemented on many computers. Most recently, we can observe improvements in software for "stream processing" of multi-media data. For example, Java's (Java® is a registered trademark of Sun Microsystems, Inc.) asynchronous image model allows image data to be streamed from the internet, which means that a client machine "applet" can start working on an image as the data becomes available. Without this capability, the user would have to wait for multi-media data to finish downloading before it could be displayed or otherwise used in the application. Nonetheless, the Java environment is not real-time and allows only limited interactivity.

Existing limitations in processing multi-media data are due in part to the quantity of data and to the fact that many of the necessary operations, such as decompression and graphic manipulation, are compute intensive. The use of faster microprocessors has been of some benefit. Indeed, the remarkable proliferation of the world-wide web must be attributed in part to advancements in microprocessor technology. Nonetheless, today's microprocessors such as the Intel X86 Pentium and Pentium II are still general purpose processors. They are optimized for multi-media applications, if at all, only in limited, discrete ways. Additional improvements will require not only specialized hardware, such as co-processors, but improvements in architecture for deploying that hardware more efficiently.

Certain types of specialized hardware have been developed to address this need. For example, digital signal processing (DSP) integrated circuits are known for processing audio data in real time. DSP devices are sometimes implemented in add-on "sound boards" for upgrading a target PC. Video random access memory (VRAM) devices are known for improving screen display refresh rates. VRAM frequently is implemented on a "video board" which is a circuit board for use in a personal computer to improve screen refresh by providing improved display bandwidth. These dedicated processors and memory are of limited benefit, however, because they are deployed in the context of conventional general purpose processor architectures. In the vernacular, these types of co-processors are "bolted onto" existing architecture. Such systems still process data essentially as flat streams of data under control of a single, general purpose central processor. The need remains, therefore, for a new architecture that more effectively takes advantage of a variety of hardware and software technologies to process multi-media applications in real time.

SUMMARY OF THE INVENTION

The background discussion above explained how growing multi-media applications and content, and demand for real-time interactivity, are driving the needs for greater computing power and higher data communication bandwidths for transferring and processing multi-media data. Because of the huge, and bandwidth limited, infrastructure already in place, increases in communication channel bandwidths, such as the expanding use of ISDN and T-1 lines, are helpful but expensive and still available only in limited places. Even where substantial communication bandwidth is available, client machine processing ability remains limited.

Technological advancements in hardware power, compression algorithms, etc. are each somewhat helpful, but these piecemeal advances provide only limited improvements because they are not coordinated. One example mentioned above is the fact that various "accelerators" such as video boards are simply bolted onto old architectures that rely on a single, general-purpose central processor. Conventional concepts of parallel computing are difficult to apply because they are not portable.

The present invention results from reevaluating the entire hardware and software environment in an effort to provide a substantial advancement in multi-media data processing. According to one aspect of the invention, an improved multi-media (MM) software and hardware architecture takes full advantage of an object-oriented paradigm, and carries that paradigm all the way through from data communication to the performance of multi-media content in real-time. In this new multi-media (MM) architecture, software objects are carried down to the execution level as light-weight processes (LWP) or threads executing in parallel on multiple processors. In prior art, object-oriented techniques are used for programming and authoring multi-media applications. To reduce data communication bandwidth requirements and provide portability across various hardware platforms, those object-oriented applications are compiled into a low-level pseudo-language (e.g. Java® byte codes), and the byte codes are interpreted at run time, essentially by translating the pseudo-language operations into equivalent operations (op codes) on the target processor.

In the new architecture of the present invention, the original "objects" and threads defined in the source program are recovered from an incoming stream of byte codes in a new type of virtual machine (VM). The new virtual machine includes class libraries for instantiating objects and methods used in the source program, and recovers the "threads" of the original application program. On the hardware side, a plurality of processors is provided under control of a micro-kernel operating system. One or more of the hardware processors are designed or optimized to carry out a specific MM function or method, such as audio decompression or visual object rotation calculations. The virtual machine correlates the objects and threads recovered from the byte code stream—consulting the class libraries—to a list of the currently available hardware resources. To the extent possible, it arranges the object methods and program threads for execution in parallel on the most appropriate processors for those tasks. This architecture delivers the performance of a parallel processing machine while maintaining portability of the pseudo-code program across a variety of platforms. Additionally, the virtual machine can automatically exploit hardware resources available to it—including cores not yet available—again without compromising portability of the application program.

Objects or threads requiring those functions directly supported by hardware are routed to the corresponding processors for execution. Other processors or "cores" can be provided that execute the virtual language (e.g. Java byte codes) directly. "Flat" threads or code segments can be routed to these "native" processors (e.g. the SUN Pico-Java Engine) for execution without translating op codes. Thus, instead of simply interpreting a serial stream of pseudo-language instructions for execution on a target processor, as in the prior art, the new architecture combines principles of parallel processing and the object-oriented paradigm to speed execution. In other words, the advantages of an object-oriented environment are preserved, and indeed extended, all the way to the hardware.

Following the object-oriented paradigm, threads and objects are executed by "calls" to a resource—here a selected hardware processor. Accordingly, one aspect of the present invention is to better "align" software processes to hardware for execution. The system is object-oriented throughout, including the virtual machine, the micro-kernel, and even the hardware in the sense that the hardware comprises discrete elements (processors or, cores in present-day technology) deployed for execution of tasks related to specific object class methods. The new virtual machine can be programmed for any target hardware platform, thus preserving the portability advantage of object-oriented environments. And, it adapts itself to the currently available platform hardware resources, thus allowing flexibility in cost vs. performance.

In a preferred embodiment, the invention includes a virtual machine program stored in a memory. The virtual machine ("VM") has access to stored libraries of object class definitions, and has access to hardware that receives and buffers an incoming stream of pseudo-language instructions such as byte codes. The VM includes a class loader that checks ensures that all classes referenced in the byte codes are present in the stored libraries, and downloads any that are missing, from network resources which may be the source transmitting the byte code stream.

The foregoing and other objects, features and advantages of the invention will become more readily apparent from the following detailed description of a preferred embodiment of the invention which proceeds with reference to the accompanying drawings.

DETAILED DESCRIPTION OF A PREFERRED EMBODIMENT

Figure 1:
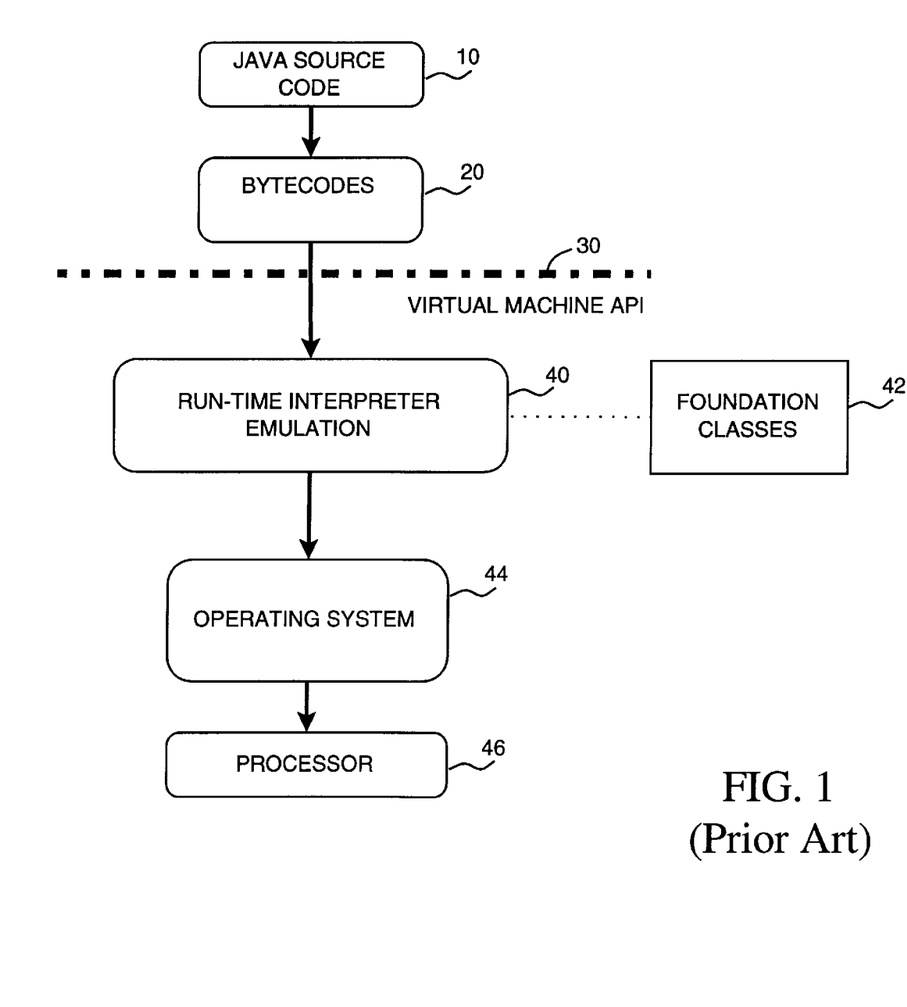
FIG. 1 is a simplified data flow diagram illustrating a prior art, object-oriented virtual machine environment useful in multi-media applications.

FIG. 1 is a data flow diagram of a virtual-machine implementation of an object-oriented programming language. Sun Microsystems' Java® environment is an example. The Java environment comprises several different parts. First, there is the Java programming language, which is in the C family of languages. It has object semantics similar to those of C++ but adds additional object features and garbage collection. Java has become well known for its support of dynamic linking, run-time code loading, and safe code execution. In FIG. 1, block 10 represents a program written in the Java language source code.

A Java language program could be compiled for execution on various machine architectures. However, a second core piece of the Java environment is the virtual machine ("VM"), indicated in FIG. 1 below dashed line 30 (the virtual machine API). The Java virtual machine implements an abstract processor architecture. This virtual machine can then be implemented in software on a variety of operating systems and hardware. The Java source code program 10 is compiled into pseudo-code, a series of "byte codes" according to the Java virtual machine instruction set. The virtual machine thus must be ported for each target platform. In the virtual machine 40, a run-time interpreter performs a task much like emulation: it translates the Java instruction set byte codes into op codes that are executable on the target platform hardware.

As part of this process, the interpreter also imports code by calls to another component of the Java environment, the Foundation Class Library—Java class definitions. This step is fundamental to the object-oriented paradigm in which program objects are merely instances of predefined classes. Other libraries available to the interpreter provide various functions that are not necessarily implemented in Java. For example, the VM will generally include a library of C-code TCP/IP functions. In any event, the resulting "interpreted" code can then be executed using calls to the target platform operating system 44 which, in turn, interfaces with the processor hardware 46. This prior art environment thus converts the original, object-oriented program into serial, flat code for execution in the target platform. It provides portability because the same source code program 10 can be executed on any platform for which the virtual machine 40 has been implemented. More detail about implementation of the Java virtual machine can be found, for example, in "Implementing the Java Virtual Machine—Java's Complex Instruction Set Can Be Built in Software or Hardware," by Brian Case, Microprocessor Report, Mar. 25, 1996, p. 12. While portability is achieved by Java, execution of the program on a client machine falls back on conventional, serial execution of flat code on a general purpose processor.

Figure 2:
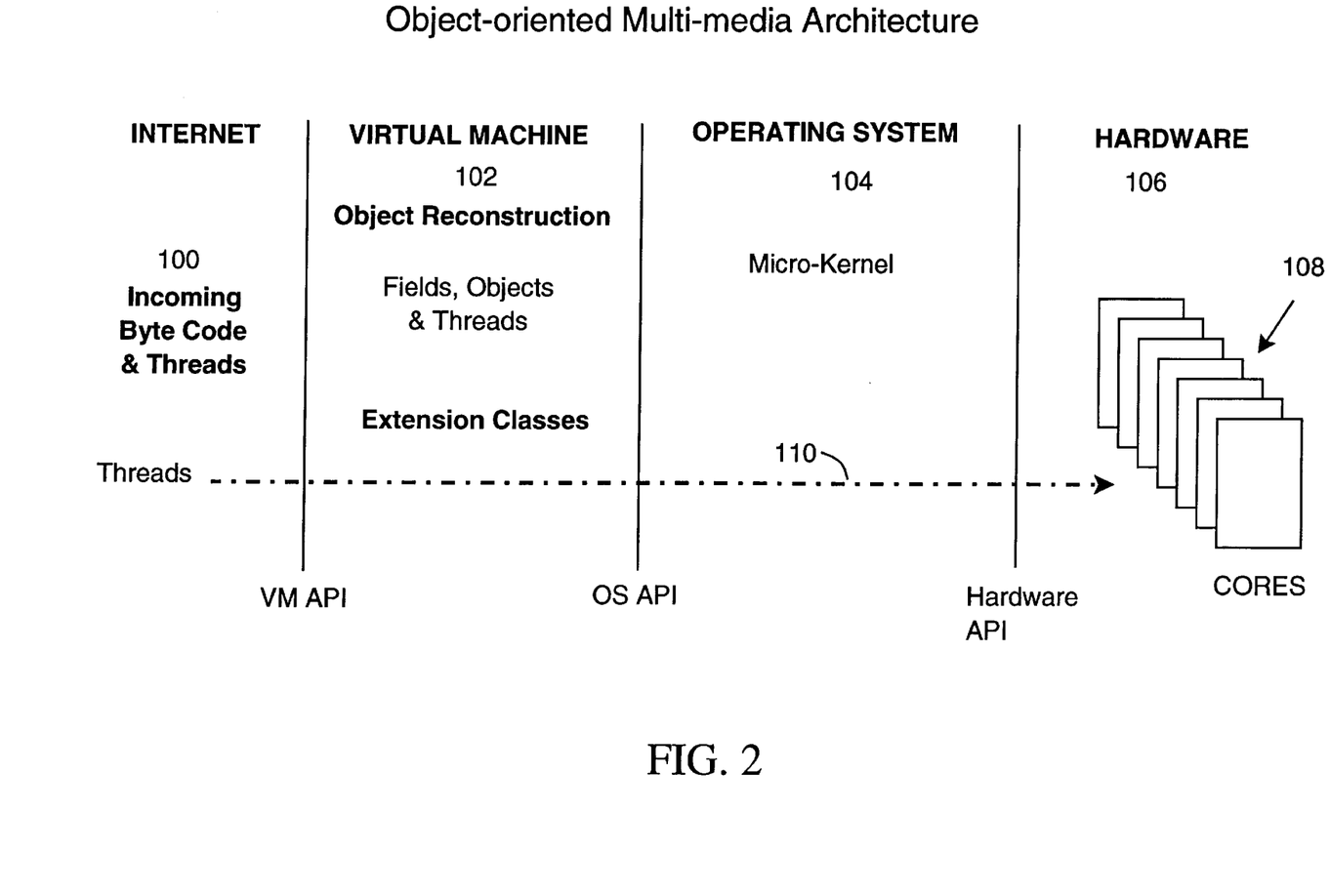
FIG. 2 illustrates a new, object-oriented, multi-processor architecture for processing multi-media applications according to the present invention.

FIG. 2 is a conceptual diagram illustrating a new multimedia architecture according to the present invention. In FIG. 2, data (here meaning program code and data) flows from the left to the right of the Figure as follows. Incoming data in the form of an object-oriented pseudo-code, such as Java byte codes, are received for execution. The byte code stream can originate locally (in the same machine) or travel over a local or wide area network from a server to a client machine. The input stream can just as well travel over a world-wide network such as the Internet 100. This stream of byte codes complies with a predefined virtual machine API. The virtual machine 102 contains a run-time interpreter, garbage collection mechanism and other features further described later. The input streams are not limited to Java byte codes, although an object-oriented pseudo-language is required. The system of the present invention will be especially useful in connection with evolving new multi-media programming languages, such as the MPEG-4 "syntactic description language".

"MPEG-4" is an emerging coding standard that will support new ways (notably content-based) for communication, access, and manipulation of digital audiovisual data. The standard is far from promulgation—it is expected to take several years to define completely. Nonetheless, the concept is clear—to provide for coding of audio-visual objects per se. In conventional "flat" representations, video and audio frames do not distinguish objects. All parts of the frame have equal priority so when coding, for example detailed background data can "steal" bits from more important foreground objects. The MPEG-4 community believe that some form of object-based coding is needed to reach new levels of performance and interactivity.

Planned MPEG-4 functionalities would readily support interactivity, high compression rates and/or universal accessibility. Key is the concept of content-based interactivity, i.e. the ability to interact with meaningful objects in an audio-visual scene. To illustrate: suppose a movie scene has a car in motion. Substantial amounts of data (whole frames) must be compressed, transferred, decompressed, displayed, refreshed, etc. continuously at real-time rates just to play the movie, even without interaction. Whole frames of data are being processed. MPEG-4 will recognize that most of that data is static, and maybe irrelevant. Objects—like the car wheels—are changing (rotating). Thus, MPEG4 coding would treat each car wheel as an object (a software object corresponding to a physical object). The MPEG-4 Syntactic Description Language (MSDL) will provided a template to support interaction with both natural and artificial objects. Instead of processing large quantities of pixel data to display the car, the wheel object described in MSDL will simply call a "spin" method. See ISO/IEC JTC1/SC29/WG11/N0998/ Coding of Moving Pictures and Associated Audio Information (MPEG-4 Proposal Package, July, 1995)(unpublished draft). The system described herein will be readily adaptable to processing of multi-media applications coded in MSDL.

Referring again to FIG. 2, the virtual machine 102 also includes at least a foundation class library (sets of software object definitions) of the source code language, and preferably further includes an extension class library. The Java foundation classes, for example, include some 15 different packages, all included in the Java Development Kit (JDK). For example, the JDK packages include java.applet, java.awt, java.io, java.net and java.image. To illustrate, one of the applet interfaces is used for playing back an audio clip. (An "interface" is a special type of Java class.) The package java.awt includes the classes and interfaces necessary for constructing user interfaces and on-screen graphics. Examples are button, label, panel, color, etc. The image package classes handle manipulation of pixel images.

Extension classes are more specialized classes, many under construction today, to implement such things as commercial transactions over the internet, cryptography, banking, database API, and various graphics operations. As will appear below, the MM architecture of the present invention can take full advantage of extension classes as they appear and, importantly, it can deploy specialized hardware processors for execution of extension class object calls. Such processors can include, for example, dedicated, special purpose processors, RISC cores, native engines or other types of processors not yet well known. The advent of new extension classes may motivate hardware designers to provide specialized processors for execution of those class methods.

In operation, the virtual machine 102 reconstructs the software objects indicated in the source code by mapping all incoming byte codes into (a) fields; (b) objects; and (c) threads. Fields are variables that are not fully disclosed at compile time. The VM resolves them before they can be accessed. Objects of course are instances of classes defined in the class libraries.

Threads, also called light-weight processes, are separate streams of control that can execute their instructions independently, allowing a multi-threaded process to perform numerous tasks concurrently. Multiple threads can run as a single process. (Some use the terms "thread" and "light-weight process" interchangeably. In some implementations, however, there is not necessarily a one-to-one correspondence between each thread and a single LWP.) However, the present invention seeks to maximize parallelism in execution, and therefore attempts to schedule every thread for separate execution, as more fully described later. The Java language implements thread classes. The Foundation and Extension Classes, which are part of the virtual machine, allow this reconstruction to succeed, because they contain the same information as the libraries that were used by the compiler to generate to pseudo-language byte codes. The VM includes a class loader component that will download any classes used in the pseudo-language that do not appear in the library.

The concept of "threads" or multi-threaded programming is known in the prior art as a methodology for writing programs so as to improve application throughput, application responsiveness and program structure, as well as efficiently exploit parallel processors where available. The research and experimental use of threads has been widespread in universities and research institutes for some time. However, it is only within the past few years that it is entering industry for implementation in commercial operating systems. Today, there are three primary sets of multi-threading libraries: UNIX, OS/2 and Windows NT. Multi-threading obviously makes it possible to obtain vastly improved performance by taking advantage of multi-processor (SMP) machines. In single-processor machines, the advantage is less obvious but still can be dramatic for some applications where multiple tasks must be carried out at (essentially) the same time.

In a typical multi-tasking operating system, such as VMS or UNIX, there is a firm dividing line between the user's space and the kernel space. This division is enforced by hardware. User programs are executed in user space. The user space includes user code, global data, program counter and a stack pointer. The data that a program or process can access and change directly is limited to data in the user's space. When the user program needs something from the kernel (for example to read a file, or find out the current time), the user program must make a system call. This is a library function that sets up some arguments, then executes a special trap instruction. This instruction causes the hardware to trap into the kernel, which then takes control of the machine. The kernel determines what action is necessary, and whether has permission to do it. Finally, the kernel performs the desired task, returning any information to the user process.

Because the operating system has complete control over I/O, memory, processors, etc. it needs to maintain data for each process that is running. This data tells the operating system what the state of that process is - - - what files are open, which user is running it, etc. So the concept of a process in the multi-tasking world extends into the kernel, where this infirmation is maintained in a process structure. Multiple processes can be run concurrently in a multi-tasking system. Each has its own memory space, its own stack, program counter, etc. No two processes can see or change each other's memory, unless they have set up a special shared memory segment. So each program has one stack, one program counter and one set of CPU registers per process. Accordingly, each of these programs or processes can do only one thing at time: they are single threaded.

Just as multi-tasking operating systems can do more than one thing concurrently by running more than a single process, a process can do more than one thing concurrently by running more than a single thread. Each thread is a different stream of control that can execute its instructions independently, allowing a multi-threaded process to perform numerous tasks concurrently. For example, one thread can run the GUI, while a second thread performs I/O and a third performs calculations. A thread is similar to a process: it comprises data, code, kernel state and a set of CPU registers. But a process is a kernel-level entity and includes such things as virtual memory map, file descriptors, user ID, etc. and each process has its own collection of these. Thus, the only way for a program to access data in the process structure, or to query or change its state, is via a system call.

In prior art, the thread is primarily a user-level entity. The thread structure is in user space and can be accessed directly with the thread library call, which are just user-level functions. The registers (stack pointer, program counter, etc.) are all part of a thread, and each thread has its own stack, but the code it is executing is not part of the thread. The actual code (function, routines, signal handlers, etc.) is global and can be executed on any thread. Importantly, all threads in a process share the state of that process. They reside in the exact same memory space, see the same functions and see the same data. When one thread alters a process variable, all the others will see the change when they next access it. When one thread opens a file to read it, all the other threads can also read from it. While this arrangement implies certain synchronization and scheduling requirements, it has the advantages of executing multiple tasks without the kernel overhead of actual process switching.

Referring again to FIG. 2, the reconstructed objects and threads comply with the operating system API 104. The operating system 104 includes a real-time micro-kernel operating system which routes the objects and the threads and the Java byte codes to multiple cores or parallel processors 108 as further explained later. An important aspect of the present invention is to better "align" program threads with hardware resources "on the fly". Because threads provide for concurrent execution, and they have access to the same user memory space, care must be taken by the programmer to coordinate or "synchronize" their operation. One thread cannot read data at the same time that another thread is modifying the same data. Thus, a thread must be able to acquire exclusive access to an object, at least temporarily. Several techniques are known for thread synchronization. In the simplest case, a Mutual Exclusion Lock or mutex allows only one thread at a time to execute a given piece of code, for example code that modifies global data. Condition variables are known for inhibiting execution of a thread until a given condition tests true.

In Java, for example, threads are supported as an integral part of the language. It provides for synchronous methods to be defined in a class protocol. When a class with synchronized methods is "instantiated," the new object is given a "monitor". To call a synchronized message in an object, a thread acquires the monitor of that object. If it is able to acquire the monitor, the thread enters the synchronized method, and while it owns the monitor, no other thread can call a synchronized method in that object. If a thread calls a synchronized method in an object and that object's monitor is owned by another thread, the calling thread is blocked until the other thread relinquished the monitor. When the original thread exits the synchronized method where it acquired the monitor, ownership of the monitor is transferred to the blocked thread, which is now able to enter the method it was blocked on. The VM 102 identifies the application layer threads, and separates them for separate, parallel execution as further described below.

The VM next generates code for execution on the host platform. Importantly, it first inspects a list of hardware resources available on the platform, comparing the identified threads and objects with the hardware list. In other words, the VM is aware of the hardware resources in the machine (even though the application programmer likely was not). Depending on the hardware resources available, appropriate addresses and variables are arranged on a stack in memory for each execution thread or LWP. Executable code is arranged and stored in memory for each thread. Generating the executable includes op code translation for those threads that will not be routed to a native processor engine. The VM then calls the micro-kernel operating system 104 to schedule execution of the threads.

Figure 5:
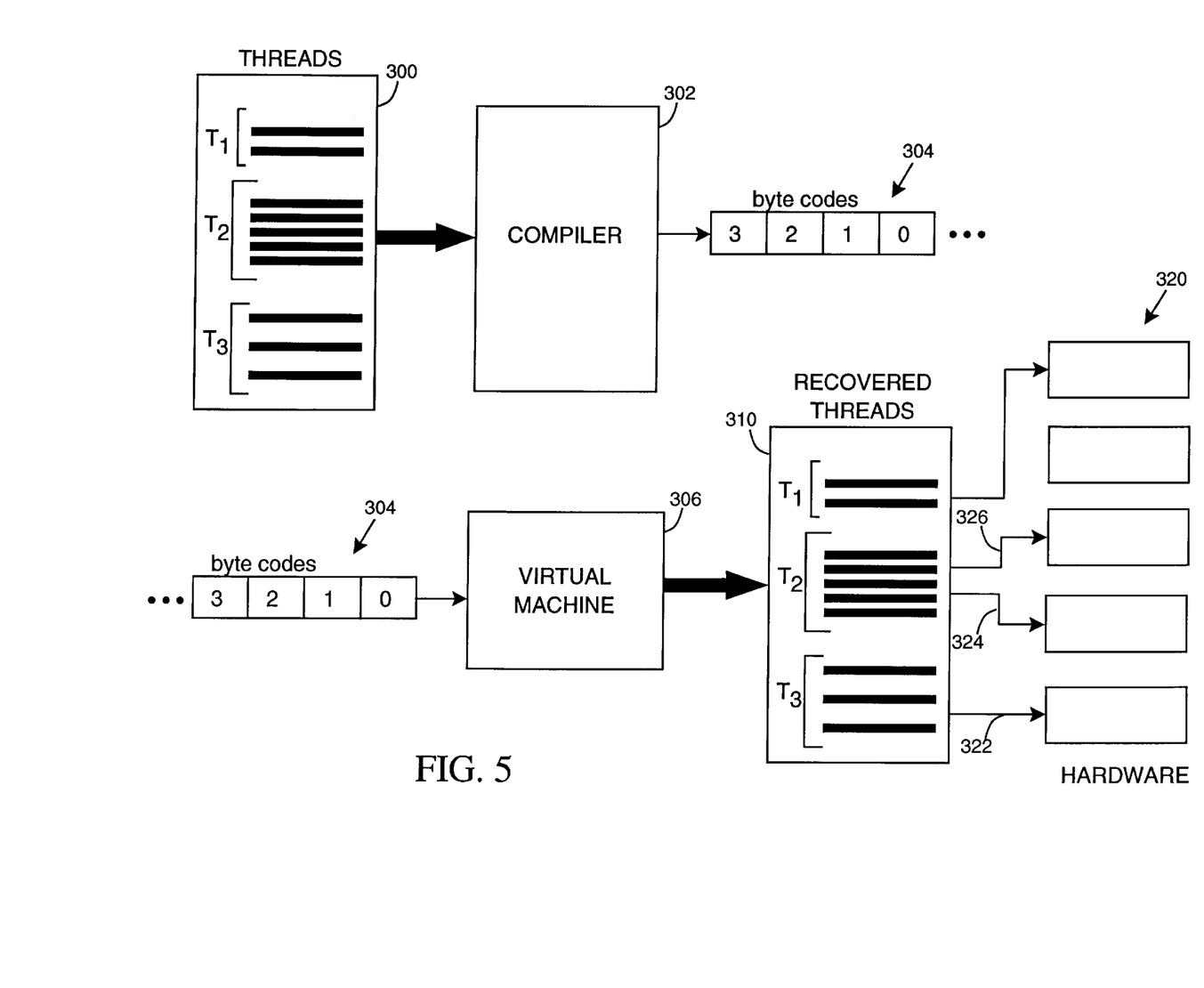
FIG. 5 is a functional block diagram illustrating handling of program threads in the new architecture of FIGS. 2 and 3.

The identification of threads for execution by the VM is not limited to those threads expressly delineated as such by the application programmer. For example, the VM may find a particular processor in the hardware resources list—say a processor for adding "base boost" to an audio file. If the VM finds the "bass boost" object called, it will arrange that call as a thread for execution on the "bass boost" hardware, because the hardware function matches the software method. In general, a "thread" in the new VM can be a thread expressly delineated by the application programmer, or it can be any object or code fragment designated by the VM as a thread for execution. Thus, the VM or the kernel can "split" a thread in two if it has appropriate hardware resources available to process both smaller threads, thereby increasing parallelism. FIG. 5 illustrates a reconstructed thread T2 which is split (see routes 324,326) for execution on two different processors.

The Micro-kernel operating system 104 can be adapted from commercially available operating systems of this type, also known as RTOS—real-time micro kernel operating system. ISI Integrated Systems Solutions of Mountain View, Calif. has such a product called PSOS. MicroWare of DesMoines, Iowa has a such a product called OS-9. And WindRiver of Oakland, Calif. offers VxWorks OS. The micro-kernel interfaces with the hardware resources 106; it sorts and directs the objects and threads to the corresponding hardware processors 108. The micro-kernel handles scheduling of hardware resources, to the extent necessary. For example, where 20 different tasks are required, but fewer than 20 processors are present, or the mix of processors does not correspond to the types of threads and objects to be executed, the micro-kernel schedules the tasks, using techniques that are known in the art. The micro-kernel also attends to handling the network file system (NFS), networking operations, peripheral device drivers, virtual memory management, user interface, and other tasks for which the operating system conventionally is responsible.

Two additional memory management tasks also are assigned to the micro-kernel. The first is "garbage collection," i.e. freeing memory assigned to an object or thread to which there is no longer any reference in the code. Details of garbage collection are known: for example, in the Java environment. The garbage collection task itself is a process, and may be assigned to a suitable processor. Preferably, the operating system is written in the Java language, and the garbage collection task can be run in native code on a Java native processor. The other special memory management task is managing distributed memory across the native processors, e.g. Pico-Java® processors.

Figure 3:
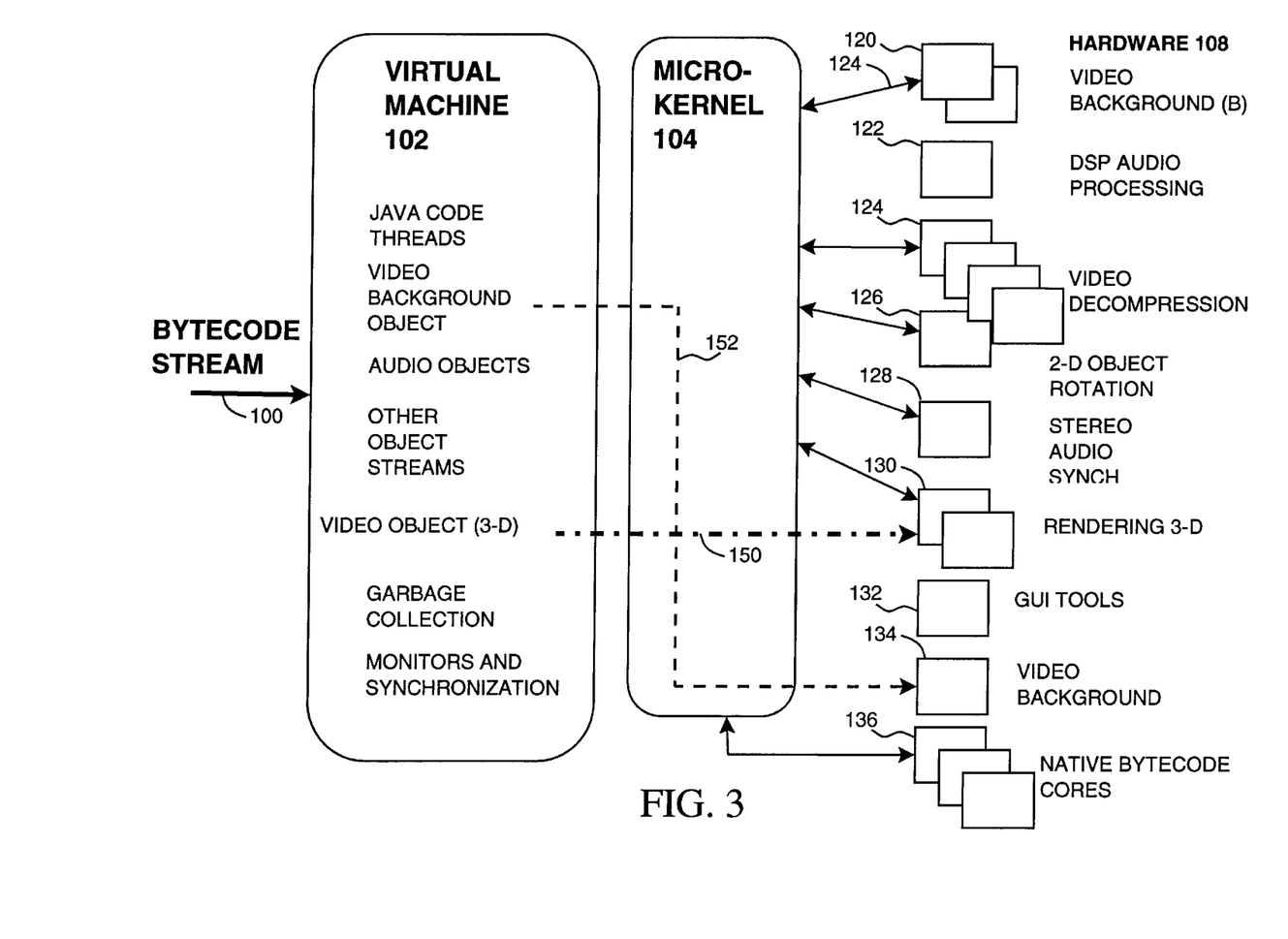
FIG. 3 illustrates the architecture of FIG. 2 in greater detail.

FIG. 3 further illustrates an embodiment of a multi-media architecture according to the present invention, here showing additional detail of the hardware resources 108. Each of the hardware resources, generally a processor core, communicates with micro-kernel 104 as indicated for example by line 124. The following types of processors are illustrative of a presently preferred embodiment of the invention. However, many different combinations of hardware resources can be applied in this architecture to optimize performance for particular multi-media applications. One of the advantages of the invention is that various processors can be added or removed at will, without changing the virtual machine. This provides great flexibility and portability for improved performance. In FIG. 3, by way of illustration, the hardware resources 108 include: video background processors 120; DSP audio processors 122; video decompression processors 124; two-dimensional object rotation processor 126; stereo audio synchronization processors 128; three-dimensional rendering processors 130; graphical user interface tools processor 132; additional video background processor 134 and one or more native byte code processors 136.

Some or all of these processors may be, for example, commercially available processor cores, such as the ARM-8 RISC processor available from RISC Machines Ltd. of Cambridge, England. Processors of that type offer high performance, on the order of 100 MIPS, in a small, lower power configuration. Additionally, one or more of the processors can be a native byte code cores. These are processors that are designed to execute the virtual machine pseudo-language instructions directly. Code segments or threads which are not appropriate for one of the available dedicated processors will be routed by the virtual machine to a native byte code core for execution as further explained later. In an alternative embodiment, some or all of the processors mentioned above can be native byte code cores. In that case, code generation in the virtual machine will not require translation of op codes. The particular selection and combination of hardware resources will involve cost/performance tradeoffs in other engineering design choices. Preferably, some or all of the processors are implemented on a single integrated circuit die to minimize size, cost and power consumption. FIG. 3 further illustrates by way of two examples how software objects are reconstructed in the virtual machine 102 and passed through to corresponding hardware processors. The examples shown are a video background object indicated by dashed line 152 and a three-dimensional video object indicated by dashed line 150.

Figure 4:
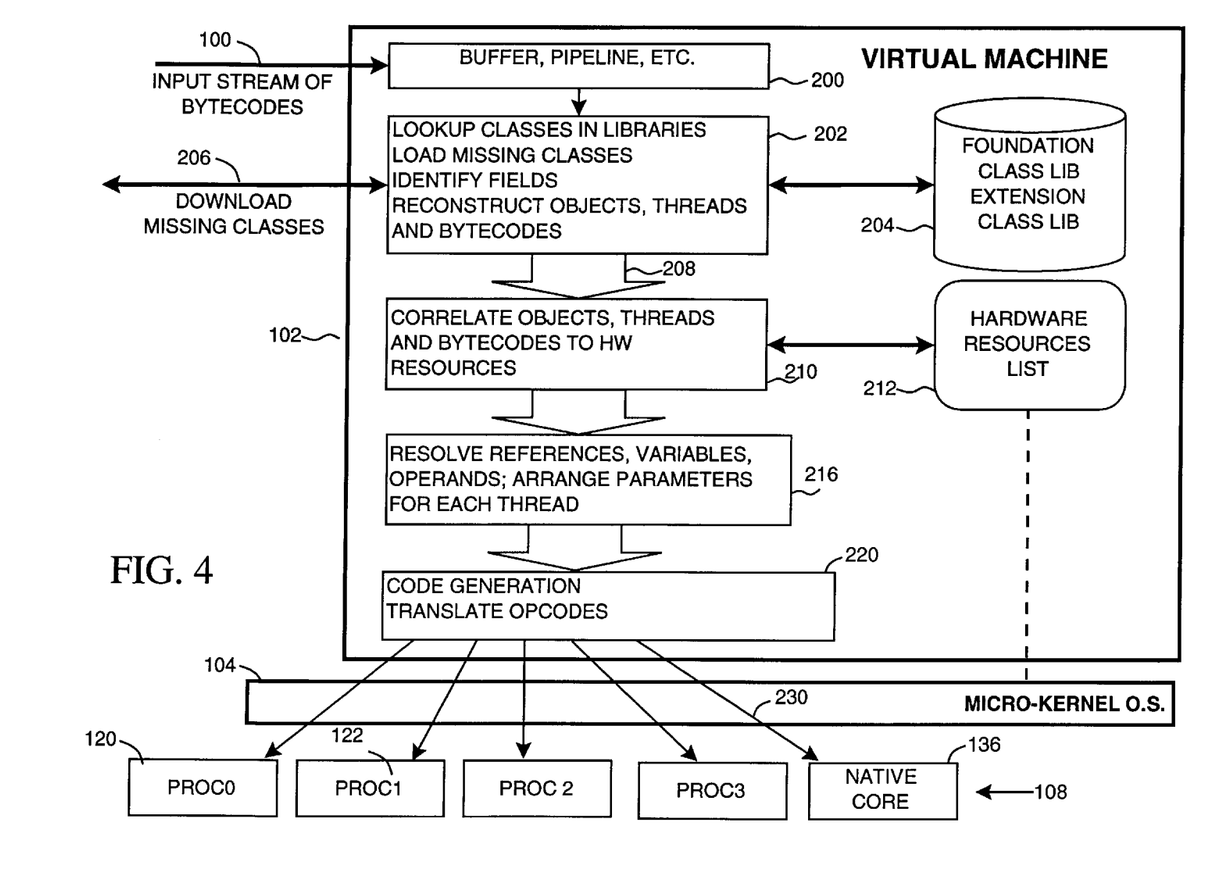
FIG. 4 is a hybrid data flow and hardware block diagram illustrating the virtual machine of FIGS. 2 and 3 in greater detail.

FIG. 4 illustrates the virtual machine program 102 in greater detail. The virtual machine, which preferably is implemented in software, communicates with the hardware buffer, pipeline or the like 200 that receives an incoming stream of byte codes 100 as described previously. The first operations of the virtual machine are indicated by reconstruction box 202. The reconstruction steps 202 include a class loader that determines what classes are referenced in the incoming byte code, and looks up those classes in the class libraries 204. The class libraries stored in the virtual machine include the application programming language libraries. For example, in the case of Java language, the Foundation libraries include the AWT classes (abstract windows tool kit), network classes, utilities, graphics, sound, video classes, etc. Examples of extension classes were mentioned previously. Preferably, applicable extension classes are stored in the virtual machine so as to minimize incremental linking of the digital classes. The reconstruction step 202 includes identifying any missing classes, i.e., classes referenced in the byte codes but not available in the stored libraries, and downloading the missing classes as indicated by arrow 206, from the source of the input stream 100. By parsing through the byte codes, and referring to the class libraries, the reconstruction steps 202 include reconstructing the original software objects, threads and code fragments that are used in the source program (10 in FIG. 1). Lists of these objects, threads and byte code segments are provided to correlation process 210 as indicated arrow 208. The correlation step 210 examines a hardware resources list 212.

A hardware resources list is formed via communication with the micro-kernel 104 which, in turn, interfaces with the hardware resources 108. Process 210 then correlates the objects, threads and byte codes that need to be executed with the currently available hardware resources. It binds each object and thread to the most appropriate available hardware resource. Examples were described earlier with reference to FIG. 3. Next, in step 216, the virtual machine resolves necessary variables (fields) and other references, using the class libraries as necessary. It arranges all of the necessary parameters and variables for execution of the tasks presented. There are essentially four types of tasks or processes to be executed: threads, objects, applets and flat code segments. A code generation process 220 is similar to conventional code generation. It includes translating op codes from the virtual machine pseudo-language to executable machine code. This can vary from one process to another, if it is designated for execution on a different hardware processor that does not use the same instruction set. Some of the processes, specifically the flat code segments, can be executed directly on a native pseudo-code processor without op code translation. For example, code segments in the Java byte code pseudo-language can be executed directly on the Pico-Java native code processor commercially available from Sun Microsystems of California. The code generation process 220 arranges the operands, variables, pointers, etc. in proper sequence on a stack for each process to be executed, and then "passes" the process to the micro-kernel 104. In this process, the code generation step 220 ensures that each executable process is directed to the appropriate processor as determined in the correlation step 210 described above. At the bottom of FIG. 4, the executable processes, indicated for example by line 230, are executed on the corresponding processors, 120, 122, 136. Various types of processors were summarized above in the description of FIG. 3.

Execution threads are not necessarily bound 1:1 to hardware resources. In some applications, even greater improvements in performance will be achieved by providing a "smart" kernel that can restructure threads "on the fly" based on the available resources.

Preferably, a substantial number of processors are implemented, say 20, 30 or even 100. Many threads are executed in parallel. Moreover, the whole process is continuous and dynamic. Thus, hardware allocations change constantly as threads complete execution and new ones are allocated. Implementation of the entire system on a single silicon "chip" will provide high performance at low cost.

Further improvements in performance can be realized by implementing a "smart controller" in the system. A smart controller effectively stands between the micro-kernel and the hardware resources and controls access to the bus. It passes addresses to processors and reduces bus traffic, thereby reducing contention and delay.

FIG. 5 further illustrates the broad concept of the invention. In FIG. 5, a source program 300 includes several program threads, indicated by T1, T2 and T3. The source program 300 is compiled in a suitable compiler 302 so as to form a series of pseudo-language byte codes 304. Compiler 302 includes class libraries for the particular object-oriented programming language used in 300. The byte codes 304 may be stored, transmitted or distributed through any of various means such as included in machine-readable distribution media such as magnetic or optical disks, over networks, internet, etc.

In the lower part of FIG. 5, the byte codes received on a client machine are processed in a virtual machine 306 as described above. The virtual machine reconstructs the program threads and objects 310, and then are routed to corresponding special purpose processors indicated generally by 320. Thus, it can be seen that the object-oriented nature of the original program 300 is reconstructed and carried through the hardware processors 320, providing benefits of parallel execution while preserving portability, compactness and the other advantages of the object-oriented paradigm. By providing appropriate hardware processors as outlined herein, the present architecture can provide real-time processing of multi-media data far more effectively than prior art solutions.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A system for real-time processing of an incoming stream of pseudo-language byte codes compiled from an object-oriented source program, the system comprising:

a memory;

input means for receiving the incoming stream of byte codes;

a plurality of hardware processors arranged in parallel; and a virtual machine computer program stored in the memory and coupled to the input means and including:

means for reconstructing a software thread from the stream of byte codes;

means for translating the reconstructed software thread into a corresponding executable process;

means for selecting an appropriate one of the hardware processors for executing the corresponding executable process; and means for routing the corresponding executable process to the selected hardware processor for execution.

2. A system according to claim 1 wherein the virtual machine program includes means for maintaining a list of hardware processors currently available in the system and means for selecting an appropriate one of the hardware processors for executing the executable process includes means for examining the list, whereby the system automatically adapts so as to take advantage of currently available hardware processors.

3. A system according to claim 1 wherein the virtual machine program includes a library of predetermined class protocols stored in the memory and the means for selecting the hardware processor includes means for correlating the list of hardware processors currently available in the system to the library of object class protocols.

4. A system according to claim 3 wherein the virtual machine program includes dynamic class loader means for determining whether an object referenced in the incoming byte code stream is an instance of a class protocol defined in the class library and for downloading any missing class protocol or library.

5. A system according to claim 1 wherein the virtual machine program includes means for reconstructing a plurality of distinct process threads from the byte codes, means for selecting a respective hardware processor for execution of each of the process threads, and means for routing each of the process threads to the corresponding selected hardware processor for parallel execution as lightweight processes.

6. A system according to claim 5 wherein the processors include at least one native byte code processor dedicated to executing native byte codes, and the virtual machine includes means for routing a flat process thread to the native byte code processor for execution without translating op codes.

7. A system according to claim 5 and further comprising a micro-kernel operating system for interfacing between the hardware processors and the virtual machine program.

8. A system according to claim 7 wherein the virtual machine program is written in an object-oriented programming language.

9. A system according to claim 8 wherein the object-oriented programming language; includes classes of the Java programming language and the virtual machine program includes a library of Java class protocols stored in the memory; and, the means for selecting the hardware processor includes means for correlating the list of hardware processors currently available in the system to the library of Java class protocols.

10. A byte-code interpreted, hardware neutral, computer-implemented virtual machine method of converting an input stream of byte codes compiled from an object-oriented, multi-media source program into a plurality of process threads for parallel execution in real-time, the method comprising the steps of:

maintaining a list of available hardware resources;

reconstructing a plurality of program objects and threads from the input stream of byte codes;

correlating the reconstructed program objects and threads to a list of the available hardware resources; and routing each of the reconstructed program objects and threads to a respective selected one of the hardware resources for substantially parallel execution, thereby providing improved execution performance while maintaining portability of the byte codes.

11. A method according to claim 10 further comprising:

identifying processes declared synchronized in the source program; and executing the said synchronized processes under control of monitors so as to ensure that variables remain in a consistent state; and scheduling all other processes for execution in parallel to the extent that the available hardware resources permit.

12. A byte code interpreted, hardware neutral, computer-implemented virtual machine method of converting an input stream of byte codes compiled from an object-oriented, multi-media source program into a plurality of process threads for parallel execution in real-time, the method comprising the steps of:

maintaining a list of available hardware resources;

reconstructing a plurality of program objects and threads from the input stream of byte codes;

correlating the reconstructed program objects and threads to a list of the available hardware resources;

routing each of the reconstructed program objects and threads to a respective selected one of the hardware resources for substantially parallel execution, thereby providing improved execution performance while maintaining portability of the byte codes; and supporting predetermined synchronization methods defined in the multi-media application, the synchronization methods allowing multiple threads within the multi-media application access to and exclusive control of shared resources.

13. A system for real-time processing of an incoming stream of object-oriented, multi-media data comprising:

input means for receiving the incoming stream of data;

a plurality of hardware processors arranged in parallel;

a virtual machine computer program coupled to the input means and including means for reconstructing a software thread from the input data, means for translating the reconstructed software thread into a corresponding executable process, means for selecting an appropriate one of the hardware processors for executing the corresponding executable process, and means for routing the corresponding executable process to the selected hardware processor for execution; and a micro-kernel operating system for managing the plurality of hardware processors, the micro-kernel operating system including means for surveying the hardware processors so as to provide a list of available processors to the virtual machine program for use in connection with said selecting an appropriate one of the hardware processors for executing the corresponding executable process.

14. A system according to claim 13 wherein the hardware processors include at least one specialized processor optimized for executing a predetermined method of a multi-media object and at least one RISC processor for executing a flat code segment in a native pseudo-language.

15. A system for real-time processing of an incoming stream of pseudo-language byte codes compiled from an object-oriented source program, the system comprising:

a memory;

input means for receiving the incoming stream of byte codes;

a plurality of hardware processors arranged in parallel, wherein the processors include at least one multi-media processor dedicated to execution of a selected multi-media method; and a virtual machine computer program stored in the memory and coupled to the input means and including:

means for reconstructing a plurality of distinct process threads from the byte codes;

means for translating the reconstructed software threads into corresponding executable processes;

means for selecting a respective hardware processor for execution of each of the process threads;

means for routing each of the process threads to the corresponding selected hardware processor for parallel execution as lightweight processes; and means for routing a multi-media process thread to the multi-media processor.

16. A system for real-time processing of an incoming stream of pseudo-language byte codes compiled from an object-oriented source program, the system comprising:

a memory;

input means for receiving the incoming stream of byte codes;

a plurality of hardware processors arranged in parallel, wherein the processors include at least one audio processor dedicated to execution of audio data; and a virtual machine computer program stored in the memory and coupled to the input means and including:

means for reconstructing a plurality of distinct process threads from the byte codes;

means for translating the reconstructed software threads into corresponding executable processes;

means for selecting a respective hardware processor for execution of each of the process threads;

means for routing each of the process threads to the corresponding selected hardware processor for parallel execution as lightweight processes; and means for routing an audio process thread to the audio processor.

17. A system for real-time processing of an incoming stream of pseudo-language byte codes compiled from an object-oriented source program, the system comprising:

a memory;

input means for receiving the incoming stream of byte codes;

a plurality of hardware processors arranged in parallel, wherein the processors include at least one graphics decompression processor dedicated to decompression of graphics data; and a virtual machine computer program stored in the memory and coupled to the input means and including:
 means for reconstructing a plurality of distinct process threads from the byte codes;
 means for translating the reconstructed software threads into corresponding executable processes;
 means for selecting a respective hardware processor for execution of each of the process threads;
 means for routing each of the process threads to the corresponding selected hardware processor for parallel execution as lightweight processes; and
 means for routing a graphics process thread to the graphics decompression processor.

18. A system for real-time processing of an incoming stream of pseudo-language byte codes compiled from an object-oriented source program, the system comprising:

a memory;

input means for receiving the incoming stream of byte codes;

a plurality of hardware processors arranged in parallel, wherein the processors include at least one graphics rendering processor dedicated to rendering graphics data; and a virtual machine computer program stored in the memory and coupled to the input means and including:
 means for reconstructing a plurality of distinct process threads from the byte codes;
 means for translating the reconstructed software threads into corresponding executable processes;
 means for selecting a respective hardware processor for execution of each of the process threads;
 means for routing each of the process threads to the corresponding selected hardware processor for parallel execution as lightweight processes; and
 means for routing a graphics process thread to the graphics rendering processor.

19. A byte code interpreted, hardware neutral, computer-implemented virtual machine method of converting an input stream of byte codes compiled from an object-oriented, multi-media source program into a plurality of process threads for parallel execution in real-time, the method comprising the steps of:

maintaining a list of available hardware resources, wherein the list of available hardware resources includes, for each hardware resource, an indication of a specific multi-media function, if any, for which the hardware resource is specially adapted;

reconstructing a plurality of program objects and threads from the input stream of byte codes;

correlating the reconstructed program objects and threads to the list of the available hardware resources, including comparing the program objects and threads to the list so as to identify those hardware resources, if any, that are specially adapted to executing any of the program objects and threads; and routing each of the reconstructed program objects and threads to a respective selected one of the hardware resources for substantially parallel execution, thereby providing improved execution performance while maintaining portability of the byte codes, including binding the program objects and threads to the corresponding identified hardware resources for execution.

20. A byte code interpreted, hardware neutral, computer-implemented virtual machine method of converting an input stream of byte codes compiled from an object-oriented, multi-media source program into a plurality of process threads for parallel execution in real-time, the method comprising the steps of:

maintaining a list of available hardware resources, wherein the hardware resources include a plurality of processors, each processor optimized for its primary function;

reconstructing a plurality of program objects and threads from the input stream of byte codes;

correlating the reconstructed program objects and threads to the list of the available hardware resources;

routing each of the reconstructed program objects and threads to a respective selected one of the hardware resources for substantially parallel execution, thereby providing improved execution performance while maintaining portability of the byte codes; and providing a coherent, global cache memory coupled to each of a plurality of the processors to improve performance.

* * * * *